United States Patent
Akahane et al.

(10) Patent No.: US 6,795,203 B1
(45) Date of Patent: Sep. 21, 2004

(54) IMAGE INPUT/OUTPUT APPARATUS

(75) Inventors: Hisayuki Akahane, Nagano-ken (JP); Hiroyasu Yokoyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 973 days.

(21) Appl. No.: 09/635,674

(22) Filed: Aug. 10, 2000

(30) Foreign Application Priority Data

| Aug. 10, 1999 | (JP) | ............................................. 11-226315 |
| Aug. 17, 1999 | (JP) | ............................................. 11-230454 |
| Jul. 24, 2000 | (JP) | ....................................... 2000-222005 |

(51) Int. Cl.⁷ ............................................. G06K 15/00
(52) U.S. Cl. ........................ 358/1.1; 358/1.14; 358/1.5
(58) Field of Search .......................... 358/1.1, 1.3, 1.5, 358/1.8, 1.12, 1.14, 1.13, 526, 471, 488, 486, 504; 346/145, 146, 139 R; 347/110, 263, 108

(56) References Cited

U.S. PATENT DOCUMENTS 6,280,025 B1 * 8/2001 Beckstrom et al. ........... 347/86

FOREIGN PATENT DOCUMENTS

JP        2002370379  A  * 12/2002    ............ B41J/2/175

* cited by examiner

*Primary Examiner*—Arthur G. Evans
(74) *Attorney, Agent, or Firm*—Sughrue Mion, PLLC

(57) ABSTRACT

An adjustment door (22) is provided on a housing (2) at an initial position of a carriage (3) on a side opposite to an original table (1). Accordingly, when printing medium powdery dust, dispersed ink or the like adheres to surfaces adjacent to a white reference (9) or a starting point (1a) for a scanner (20), it can be easily removed through the adjustment door (22). Since the gap between the original table (1) and the adjustment door (22) corresponds to the initial position of the carriage (3), a space for accommodating the carriage (3) at the initial position is not required at the end portion of the housing (2), and thus the size of an image input/output apparatus (100) can be reduced and the space required for it's installation can be easily obtained. Further, since a transparent detachable partition member (32) is detachably attached to a frame member (33), a printing medium jam in a printer (50) can be easily eliminated by removing the detachable partition wall (32) from the frame member (33).

20 Claims, 11 Drawing Sheets

IMAGE INPUT/OUTPUT APPARATUS

BACKGROUND OF THE INVENTION

1. Field of the Invention

The present invention relates to an image input/output apparatus. More particularly, the present invention relates to an image input/output apparatus including an image reading portion which converts light from an original into an electric signal and reads an image data, and an image printer which prints an image on a printing medium based on an image data that are read by the image reading portion.

The present application is based on Japanese Patent Application Nos. Hei. 11-226315, Hei. 11-230454, and 2000-222005, which are incorporated herein by reference.

2. Description of the Related Art

Conventionally, there is well known an image scanner, which moves a carriage in parallel to the surface of an original, and which reads the original image. An image pickup means has a line sensor, such as a CCD, and is mounted on the carriage.

For example, a flat-bed-type image-reading apparatus has a transparent table, on which an original is placed, on the top of a box-shaped housing. A movable carriage, which is movable in parallel to the original table, is provided inside the housing. A light source and an image pickup means are mounted on the carriage. The light irradiated from the light source is reflected by the surface of an original that is placed on the original table, and is concentrated and transmitted to the pickup means by a condenser.

The image data that are read by the image scanner thus arranged are finally printed. To print the image data, a processor, such as a personal computer, must be employed.

When a user employs a personal computer in order to print an image, the user must enter a command as determined by an operating system, and must activate a printing application program and a printer driver stored on a storage device, such as a magnetic disk.

However, a predetermined period of time is required to activate the application program or the printer driver, and many problems must be overcome in order for a personal computer to be used as desired. Since there are many users who can not use their personal computers as they desire, for printing images that are read by image scanners, it is apparent that either it is difficult for users to install printing application programs or printer drivers in personal computers, or else that users do not understand how to enter appropriate commands.

Therefore, an image input/output apparatus has been proposed to be able to print an image, based on an image data acquired by reading an original, without the apparatus being connected to a personal computer. This image input/output apparatus has a two-story image scanner construction in which an image scanner reads an original to obtain an image data and an image printer prints an image on a printing medium based on the image data read by the image reading portion. Generally, the image scanner is located on the upper stage and the image printer is located on the lower stage.

In the meantime, the pickup means, which is mounted on the carriage of the image scanner, must read a white reference before the original is read. Therefore, the initial position of the carriage before conducting the image reading is located adjacent to the starting point of the original. In other words, the initial position of the carriage, at which the carriage is put in the power-off state or the white reference of the original is read, is located adjacent to the starting point of the original. Furthermore, the ink cartridge of the image printer can not be exchanged at the initial position of the image printer in which the image printer is put in the power-off state, because the apparatus detects the remaining ink quantity. Thus, the initial position of the ink cartridge is located a predetermined distance away from the position of a cartridge exchange door at which the ink cartridge can be exchanged. For example, the readout starting point and the initial position of the carriage are located at one end portion of the housing in which the image scanner and the image printer are accommodated, and the cartridge exchange door is located at the other end portion of the housing. With this arrangement, any difficulty in exchanging ink cartridges is prevented.

As described above, in case where the readout starting point and the initial position of the carriage, and the cartridge exchange door are located at opposite end portions of the housing, when a powdery dust generated from a printing medium or a dispersed ink enters an inside of the image scanner from the image printer and also adheres to the white reference or a place adjacent to the readout starting point on the original table, neither the powdery dust nor the dispersed ink is easily removed. Furthermore, since the space required for accommodating the carriage and the white reference must be obtained at the end portion of the housing, the size of the apparatus is increased and a large installation area is required for it.

As one means for preventing a paper powdery dust or a dispersed ink from entering the image scanner, it is considered that a partition is formed between the image scanner and the image printer.

However, in case where the partition is formed between the image scanner and the image printer, if a paper jam occurs in the image printer for some reason, it is difficult to remove the paper which has caused the jam. Furthermore, since the image printer is located at the lower stage, it is not easy to for a user to ascertain how the paper is jammed.

SUMMARY OF THE INVENTION

It is, therefore, an object of the present invention to provide an image input/output apparatus, which can be miniaturized, and for which the maintenance is easily conducted.

Further, it is another object of the present invention to provide an image input/output apparatus, in which a printing medium jammed in an image printing portion can be easily removed.

Furthermore, it is the other object of the present invention to provide an image input/output apparatus with which it can easily be ascertained how a printing medium is jammed in an image printing portion.

In a first aspect of the present invention, there is provided an image input/output apparatus which comprises an image reading portion having an original table on which an original is mountable, and a carriage which is movable in parallel to the original table, an image printing portion which is capable of printing on a printing medium an image based on an image data which has been read by the image reading portion, a signal processing portion which is capable of controlling the image reading portion and the image printing portion, a housing which forms a space into which the image reading portion, the image printing portion and the signal processing portion are attachable, and a door unit disposed on the housing at an initial position side of the carriage at which the carriage is positioned before reading an image.

In a second aspect of the present invention, preferably, the space formed by the housing includes a first accommodation space in which the image reading portion is accommodated, and a second accommodation space in which the image printing portion is accommodated.

According to the first aspect or the second aspect of the present invention, the door unit is located at the initial position side of the carriage. Thus, when a powdery dust generated from a printing medium or a dispersed ink enters the image reading portion from the image printing portion, and adheres to a white reference or to a place adjacent to the readout starting point of the original table, a user can insert the hand through an opening of the door unit and easily remove the powdery dust or the dispersed ink. Accordingly, the maintenance for the image input/output apparatus is easily performed. Additionally, since the initial position of the carriage can be so set that it is located between the original table and the door unit, a space for storing the carriage at the initial position is not required to ensure at the end portion of the housing, and therefore, the image input/output apparatus can be compactly made, and the space required for its installation can be reduced.

In a third aspect of the present invention, preferably, the door unit includes a first door through which an exterior of the first accommodation space communicates with an interior of the first accommodation space, and a second door which is located inside the first door, and through which the first accommodation space communicates with the second accommodation space.

According to the third aspect of the present invention, a user can open the first door and easily clean the white reference and the original table. Furthermore, when the second door is opened, the user can, for example, easily exchange the ink cartridge in the image printing portion.

In a fourth aspect of the present invention, preferably, when an electric power is supplied to the signal processing portion and the first door is opened, the second door is opened.

According to the fourth aspect of the present invention, when the apparatus is powered on and the first door is opened, the second door is opened so that maintenance can be easily performed.

In a fifth aspect of the present invention, preferably, the door unit includes a sensor which detects an opened/closed state of the first door, and wherein the second door is opened when the carriage is moved to the initial position by the signal processing portion in accordance with an electric signal output from the sensor.

According to the fifth aspect of the present invention, the carriage is controlled in accordance with the open/closed state of the first door. Since the second door can be precisely opened or closed, the maintenance can be easily performed.

In a sixth aspect of the present invention, preferably, a method of adjusting the image printing portion is displayed on a display unit provided on the face of the second door that is opposite to the first door.

According to the sixth aspect of the present invention, for example, a method for exchanging the ink cartridge is displayed on the display unit, so that a user can easily exchange the ink cartridge.

In a seventh aspect of the present invention, preferably, the image input/output apparatus further comprises an opening/closing device which partitions the first accommodation space and the second accommodation space, and which permits or denies communication between the first accommodation space and the second accommodation space.

According to the seventh aspect of the present invention, when in the image printing portion a printing medium, such as paper, causes a jam, a user can employ the opening/closing device to connect the first and the second accommodation spaces, and can easily remove the jammed printing medium. In addition, when the apparatus is used normally, the opening/closing device inhibits the communication between the first and second accommodation spaces, so that a powdery dust or a dispersed ink in the image printing portion can be prevented from entering the image reading portion. Therefore, the maintenance of the apparatus can be easily performed.

In a eighth aspect of the present invention, preferably, the opening/closing device includes an opening, through which the first accommodation space communicates with the second accommodation space, and a detachable member detachably mounted into the opening.

According to the eighth aspect of the present invention, for example, when a printing medium is jammed in the image printing portion, only removal of the detachable member is needed to enable the jammed printing medium to be easily eliminated. Furthermore, since the detachable member is attached to the apparatus, the communication between the first and second accommodation spaces can be easily inhibited, and a powdery dust or a dispersed ink can be prevented from entering the image reading portion. Therefore, the maintenance of the apparatus can be easily performed.

In a ninth aspect of the present invention, preferably, the detachable member is located adjacent to the second door when the second door is closed.

According to the ninth aspect of the present invention, when the second door is closed, communication between the first and the second accommodation spaces is inhibited. As a result, a powdery dust and a dispersed ink can be prevented from entering the image reading portion.

In a tenth aspect of the present invention, preferably, the detachable member is slidably disposed in parallel to a direction in which the carriage is moved.

According to the tenth aspect of the present invention, in the image input/output apparatus, the detachable member can be slid in the direction in which the carriage moves, i.e., in the sub-scanning direction. Thus, when the second door is opened, the detachable member can be removed from the housing. Afterwards, a user can easily insert the hand into the image printing portion and easily remove a jammed printing medium.

In an eleventh aspect of the present invention, preferably, the detachable member is formed of a transparent material.

According to the eleventh aspect of the present invention, the interior of the image printing portion can be viewed from the image reading portion through the detachable member. Accordingly, it can be ascertained whether a paper jam in the image printing portion has occurred.

DETAILED DESCRIPTION OF THE PREFERRED EMBODIMENT

One embodiment of the present invention will now be described while referring to FIGS. 1 to 11.

In this embodiment, the present invention is applied for an image input/output apparatus that comprises a flat-bet image scanner having a movable carriage, and a full-color image printer of an ink jet type.

Figure 2:
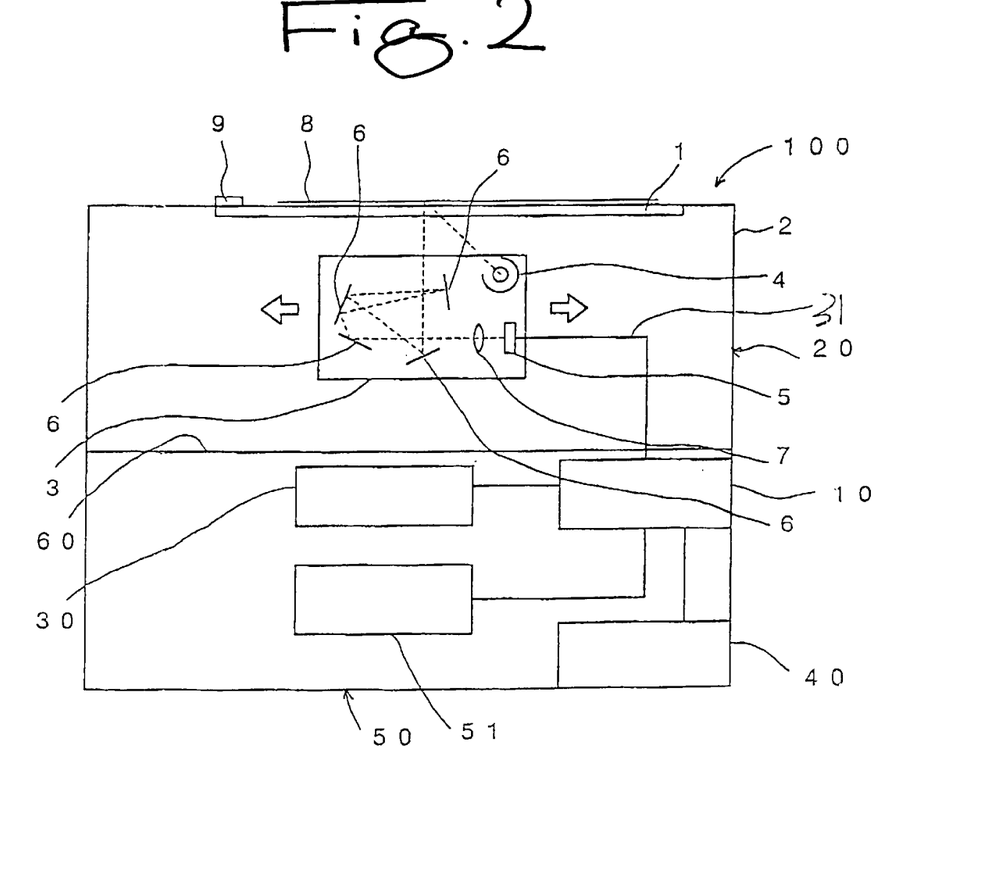
FIG. 2 is a block diagram illustrating the image input/output apparatus according to the embodiment.

As is shown in FIG. 2, an image input/output apparatus 100 comprises: a scanner 20 for reading an image, a signal processor 10, a printer 50 for printing an image, an operating unit 30, and a power source 40. The scanner 20, the signal processor 10, the printer 50, the operating unit 30 and the power source 40 are partitioned by a frame member 60 that is, for example, a metal plate. That is, the inside of a case 2, which serves as a housing, is divided into a first accommodation space wherein the scanner 20 is accommodated, and a second accommodation space in which the signal processor 10, the operating unit 30, the power source 40 and the printer 50 are accommodated.

In the scanner 20, an original table 1 that is formed of, for example, a transparent plate, such as glass, is provided on the top of the housing 2. A carriage 3 is disposed in the housing 2 so that the carriage 3 is moved in parallel to the original table 1 by a drive device 70. A light source 4 and a color pickup device 5 are mounted on the carriage 3, and light emitted from the light source 4 is reflected by the surface of an original 8 that is placed on the original table 1, and is then reflected by multiple mirrors 6, is concentrated by a condenser 7, and is transmitted to a color pickup device 5. The color pickup device 5 converts a red (R) light beam, a green (G) light beam and a blue (B) light beam into electric signals, and outputs these signals. Since the light is reflected by the mirrors 6, the length of the optical path from the original 8 to the condenser 7 is increased. A white reference 9, which has a reflective face having a uniformly high reflectivity, is provided at the end portion of the original table 1 in the direction in which the carriage 3 is moved, and to read a transparent original, such as a film, a second light source, such as a face light source, is provided above the original table 1.

Figure 3A:
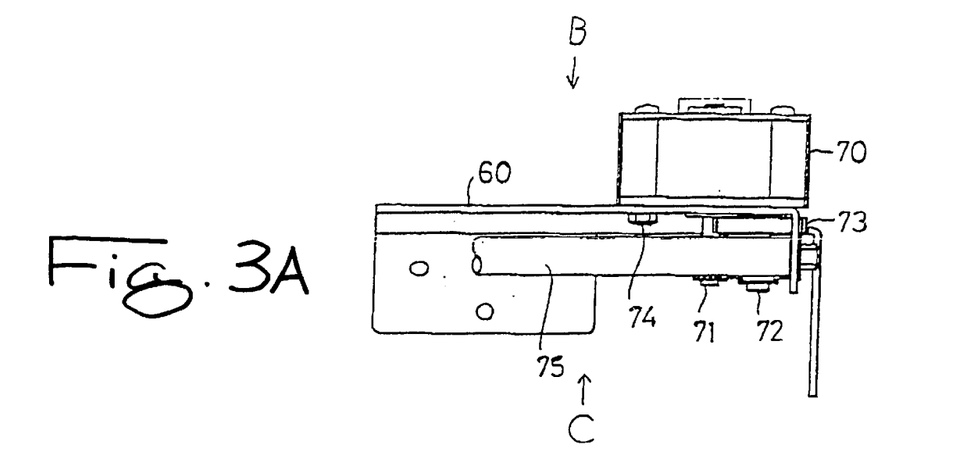
FIGS. 3A to 3C are specific diagrams showing the drive device of the image input/output apparatus according to the embodiment, with FIG. 3A being a plan view, FIG. 3B being a diagram viewed in the direction indicated by an arrow B, and FIG. 3C being a diagram for FIG. 3A viewed in the direction indicated by an arrow C.
Figure 3B:
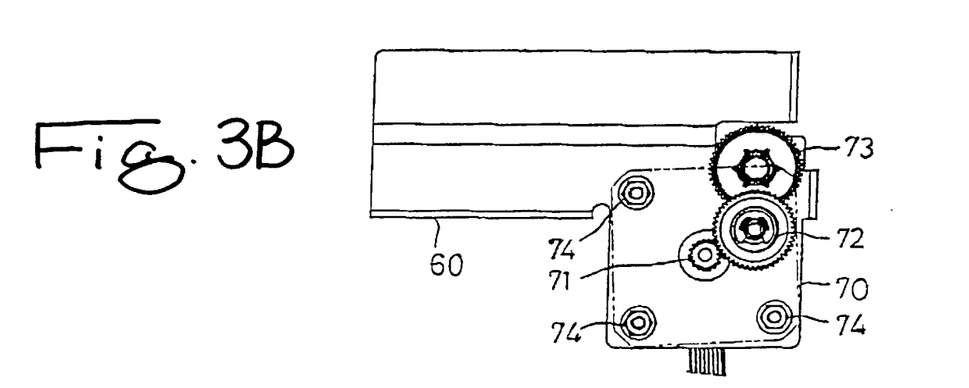
Figure 3C:
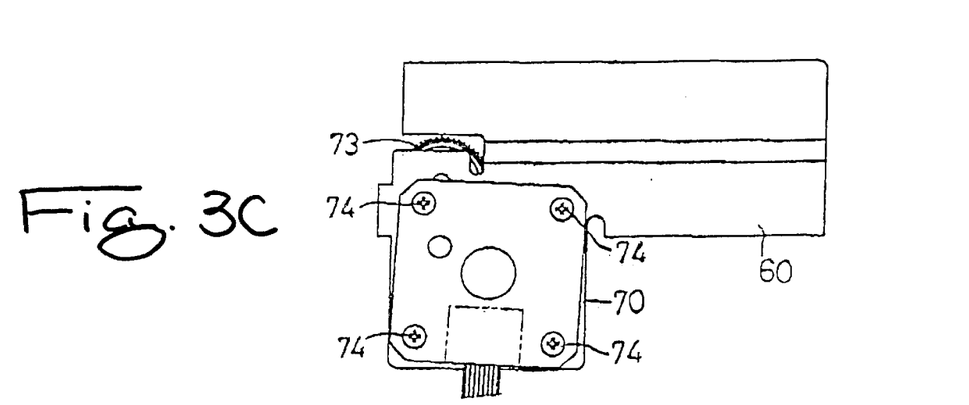

As is shown in FIGS. 3A, 3B and 3C, the drive device 70 is perpendicularly suspended outside the frame member 60 by using a bolt 74. The drive device 70 includes gears 71, 72 and 73, and under the control of a control device 14, employs a drive belt (not shown) to drive the carriage 3 in FIG. 2 along a carriage shaft 75. Since the drive device 70 is rectangularly shaped, it is perpendicularly suspended outside the frame member 60, and the perpendicular height of the scanner 20 is reduced in comparison with the case where the drive device 70 is arranged inside the frame member 60. To simplify the explanation, the drive belt is not shown in FIG. 3A, and the carriage shaft and the drive belt are not shown in FIG. 3B.

Figure 4:
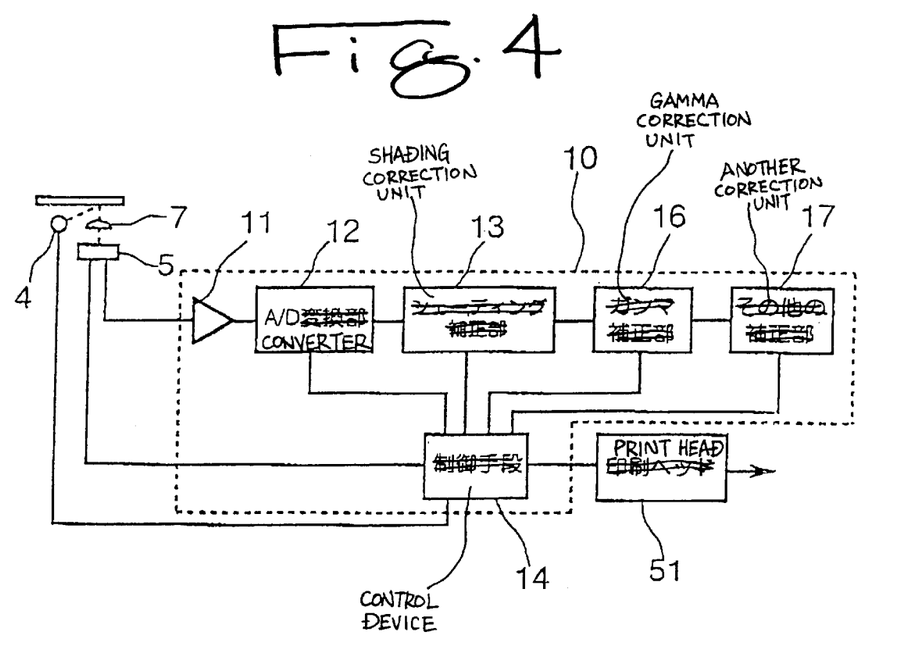
FIG. 4 is a block diagram showing the signal processor of the image input/output apparatus according to the embodiment.

As is shown in FIG. 4, the signal processor 10 comprises an amplifier 11, an A/D converter 12, a shading correction unit 13, a gamma correction unit 16, another correction unit 17, and the control device 14. The control device 14 is a micro computer that includes a CPU, a RAM, a ROM, etc..

The A/D converter 12 receives a data inputted from the amplifier 11 and supplied from the color pickup device 5, converts the data into a digital signal, and transmits the digital signal to the shading correction unit 13. When the readout output is 10 bits for example, the digital signal means a 1024 gradation signal indicating the numerical values 0 to 1023. The shading correction unit 13 employs the data that are obtained at the white reference 9 before the reading is begun to correct the difference in the sensitivity of each photo-electric converting element, and variances in the volume of the light received from the light source 4. The pixel data obtained by the shading correction is transmitted to the gamma correction unit 16, whereat a gamma correction is performed by employing a predetermined gamma function, and the light volume signal received from the A/D converter 12 is converted into an image signal. The correction unit 17 then performs color correction, edge enhancement, and area enlargement/reduction.

Figure 1:
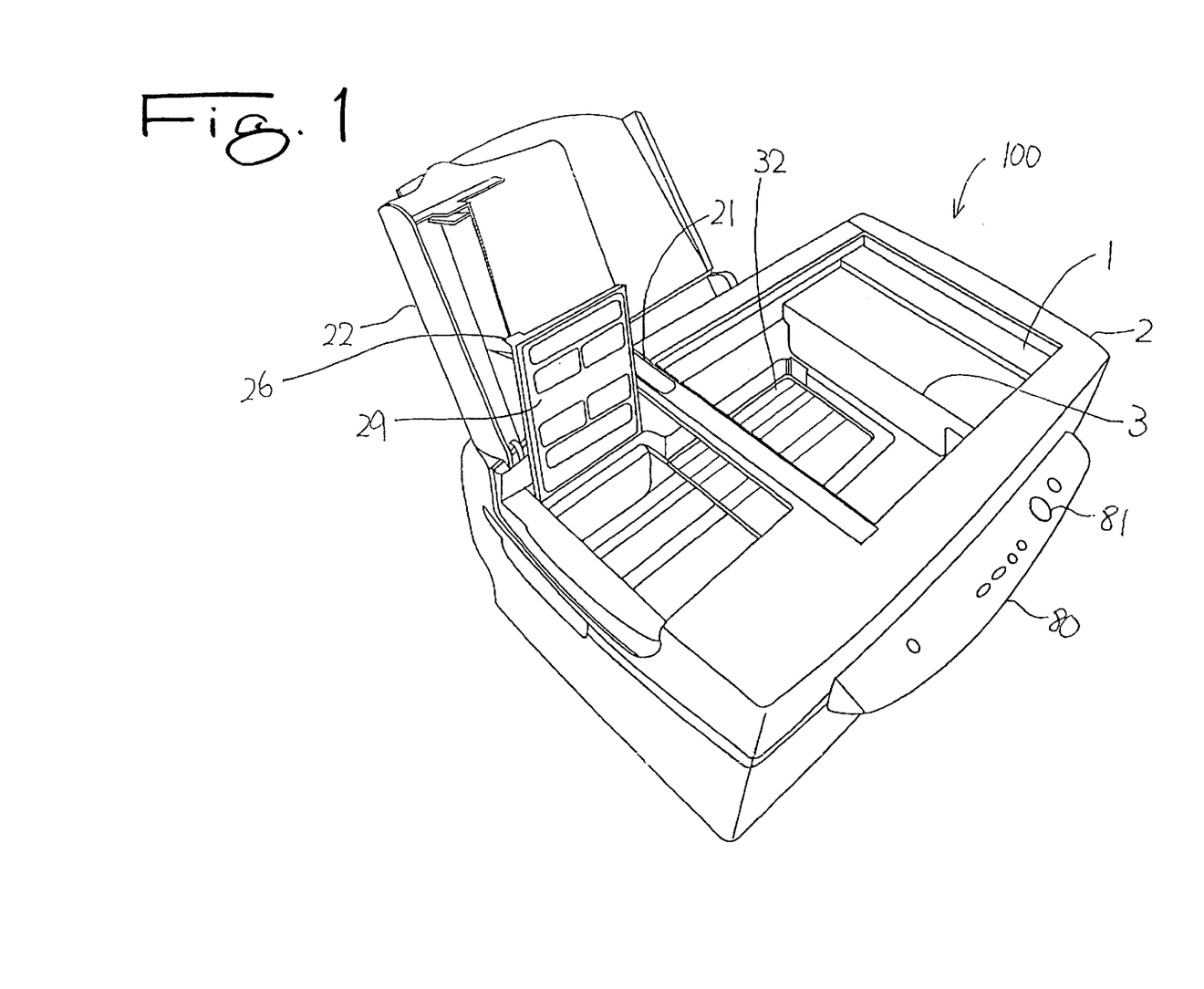
FIG. 1 is a schematic perspective view of an image input/output apparatus according to one embodiment of the present invention.

As is shown in FIG. 1, the operating unit 30 has a console panel 80, which projects externally from the housing 2, on which a print switch 81 is provided. When the print switch 81 is turned on, the printer 50, which via the signal processor 10 is connected to the scanner 20, prints an image. Furthermore, when the image input/output apparatus 100 is connected to a personal computer (not shown), in response to manipulation of the operating unit 30 an image data read by the scanner 20 are transmitted to the personal computer. In addition, when an instruction is issued by the personal computer (not shown) to the image input/output apparatus 100, the printer 50 can print the image data that are recorded on a recording medium, such as a floppy disk, a CD-ROM or a magneto-optical disk (MO) loaded in the personal computer.

As is shown in FIG. 2, the power source 40, which has an inlet (not shown) through which A/C 200 V or A/C 120 V is supplied, can supply power to the scanner 20, the signal processor 10, the operating unit 30 and the printer 50.

The printer 50 includes a paper feeding device (not shown) and a print head 51, which is provided with a pressure generating device (not shown). And when, in accordance with a drive signal, the control device 14 applies a voltage to the pressure generating device, the volume of an ink chamber is increased or reduced. As the volume of the ink chamber is changed, the pressure inside the ink chamber is also varied, and ink in the ink chamber is ejected as an ink droplet onto a printing medium (not shown). Included in the print head 51 are ink tanks in which six colored inks, cyan (C), magenta (M), light cyan (c), light magenta (m), yellow (Y) and black (K), are contained, and nozzles through which ink is ejected onto a printing medium.

Since the six colored inks, cyan (C), magenta (M), light cyan (c), light magenta (m), yellow (Y) and black (K), are employed, an expression with extremely smooth tones is available, and ink dots are not outstanding, especially in a bright portion, such as a flesh color. Furthermore, a color image is also available by combining four colors, cyan (C), magenta (M), yellow (Y) and black (K). To print black by superimposing the C, M and Y inks, the K ink may be not employed.

The scanner 20 of the thus arranged image input/output apparatus 100 will now be described in detail.

As is shown in FIG. 2, the white reference 9 is provided at one end portion of the original table 1. Before an image is read, i.e, when the carriage 3 is in the power-OFF state, or when the white reference 9 is to be read, the white reference 9 and the initial position of the carriage 3 overlap. The carriage 3 is electrically connected to the signal processor 10 in FIG. 4 by a flexible flat cable (FFC) 31, and a starting point display unit 21 is provided adjacent to a readout starting point 1a on the original table 1.

Figure 5:
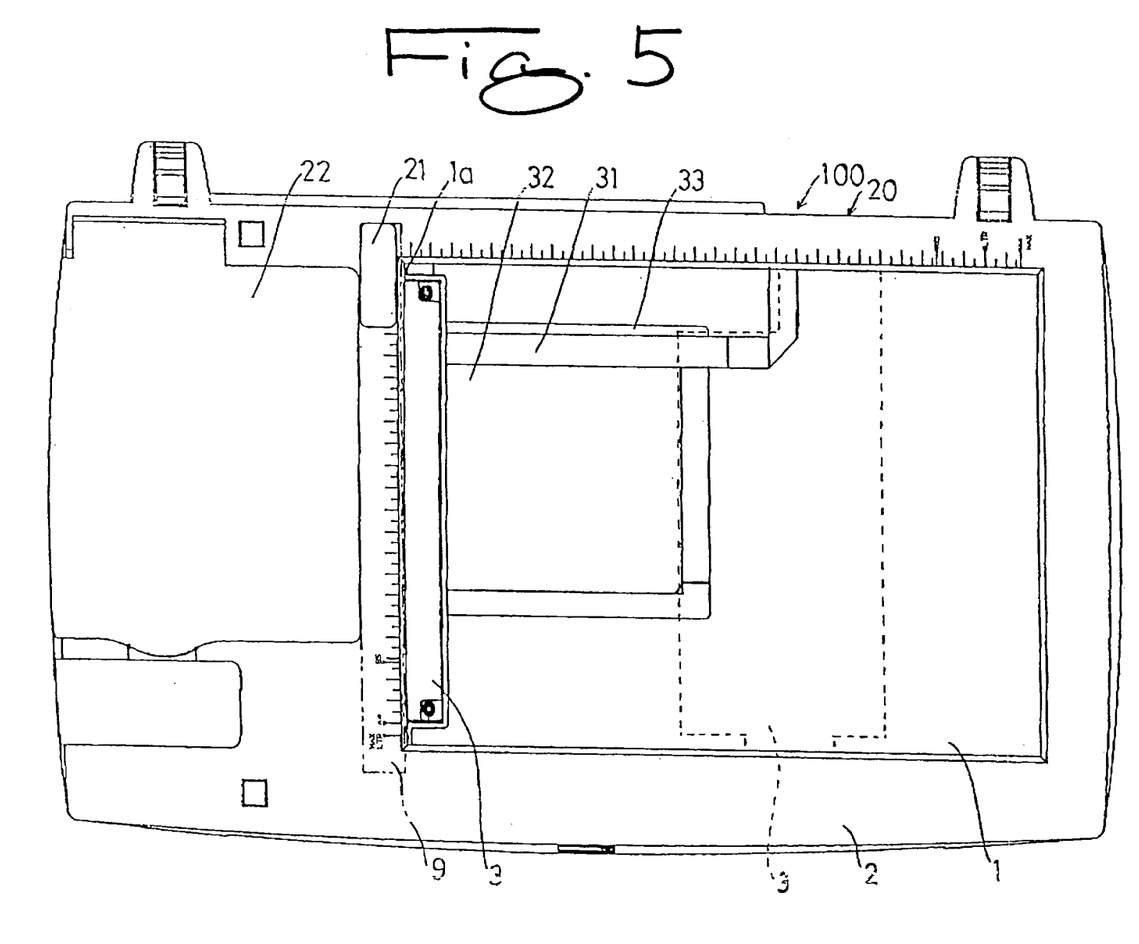
FIG. 5 is a specific plan view of the image input/output apparatus according to the embodiment.

As is shown in FIGS. 1 and 5, an adjustment door 22, which serves as a first door, is located on the top of the housing 2, on the side opposite to the original table 1, with the white reference 9 and the initial position of the carriage 3 in between. The adjustment door 22 is an opening/closing door that permits or inhibits communication between the inside and the outside of the first accommodation space in which the scanner 20 is retained.

Figure 6:
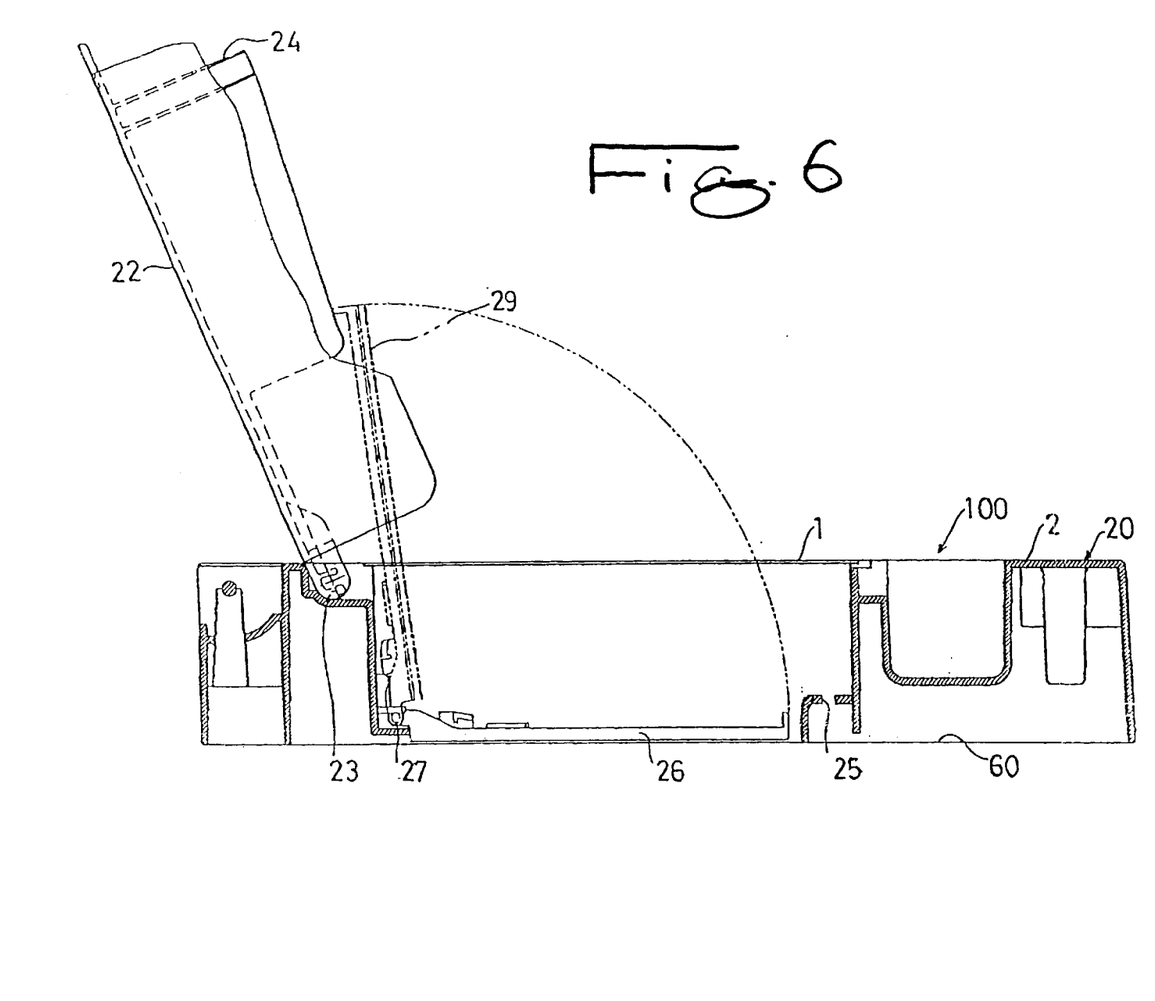
FIG. 6 is a specific cross-sectional view of the vicinity of the adjustment door and the cartridge exchange door in the image input/output apparatus according to the embodiment.

As is shown in FIG. 6, the adjustment door 22 includes a hinge 23 and a protrusion 24, and is pivotable through the hinge 23. When the adjustment door 22 is closed, the protrusion 24 is fitted into a hole 25 that is formed in the top of the housing 2. A light shielding sensor (not shown) is provided inside the hole 25, and is electrically connected to the control device 14 in FIG. 4. With this arrangement, when the apparatus is powered on the light shielding sensor, controlled by the control device 14, detects the presence or absence of the protrusion 24 in the hole 25, i.e., whether the adjustment door 22 is open or closed.

Figure 7:
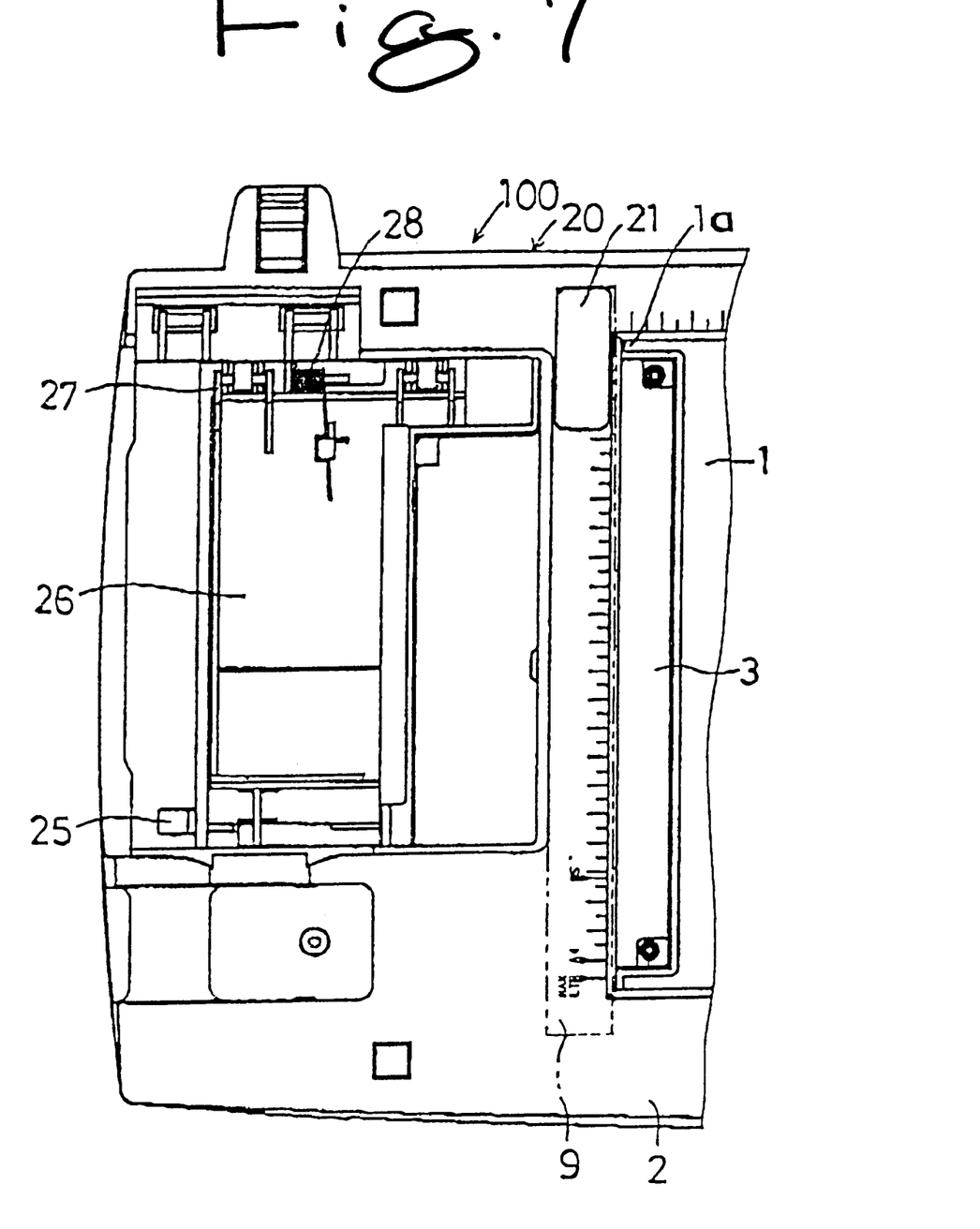
FIG. 7 is a specific plan view of the adjustment door of the image input/output apparatus according to the embodiment.

Therefore, the carriage 3 is controlled by the control device 14 in accordance with the state of the adjustment door 22, and is moved to a standby position indicated by broken lines in FIG. 5, or to the initial position shown in FIG. 7.

In this embodiment, when the adjustment door 22 is open, a user can insert his or her hand through the opening and clean the white reference 9 or the original table 1, or can remove a detachable partition wall 32 and remove a jammed printing medium from the printer 50.

Furthermore, as is shown in FIGS. 1 and 6, a cartridge exchange door 26, which serves as a second door, is internally provided below the adjustment door 22. The cartridge exchange door 26 is an opening/closing door that permits or inhibits communication between the first accommodation space, in which the scanner 20 is retained, and the second accommodation space, in which the printer 50 is retained. With this door 26, powdery dust from the printing medium and dispersed ink in the printer 50 can be prevented from entering the scanner 20 and adhering adjacent to the white reference 9 and the starting point 1a of the original table 1.

As is shown in FIG. 6, the cartridge exchange door 26 is secured by and is pivotable through a hinge 27, and as shown in FIG. 7 the cartridge exchange door 26 and the housing 2 are connected by a spring 28. One end of the spring 28 is fixed to the upper face of the cartridge exchange door 26, and the other end is secured to the fixed portion (not shown) of the housing 2.

The spring 28 urges the cartridge exchange door 26 in the direction in which the cartridge exchange door 26 is open. Therefore, when the adjustment door 22 is closed, the lower face of the adjustment door contacts and presses down the upper face of the cartridge exchange 26 and holds the door 26 closed. Then, when the adjustment door 22 is opened, pressure applied by the lower face of the adjustment door 22 to the upper face of the cartridge exchange 26 is released, and the door 26 opens.

As is shown in FIGS. 1 and 6, instruction label 29 is glued to the lower face of the cartridge exchange door 26, i.e., the face furthest from the adjustment door 22. On the instruction label 29 is illustrated a method for exchanging ink cartridges 52 and 53. Therefore, when the cartridge exchange door 26 is opened, the method for exchanging the ink cartridges 52 and 53 is provided for the user. The door unit employed in this case comprises the adjustment door 22, the light shielding sensor and the cartridge exchange door 26.

When the apparatus is powered off, as is shown in FIG. 7 the carriage is moved to the initial position above the cartridge exchange door 26. Thus, in this state, even when the user raises the adjustment door 22, the lower face of the carriage 3 contacts the upper face of the cartridge exchange door 26 and holds it closed, as is indicated by solid line in FIG. 6, countering the urging force of the spring 28.

Figure 8:
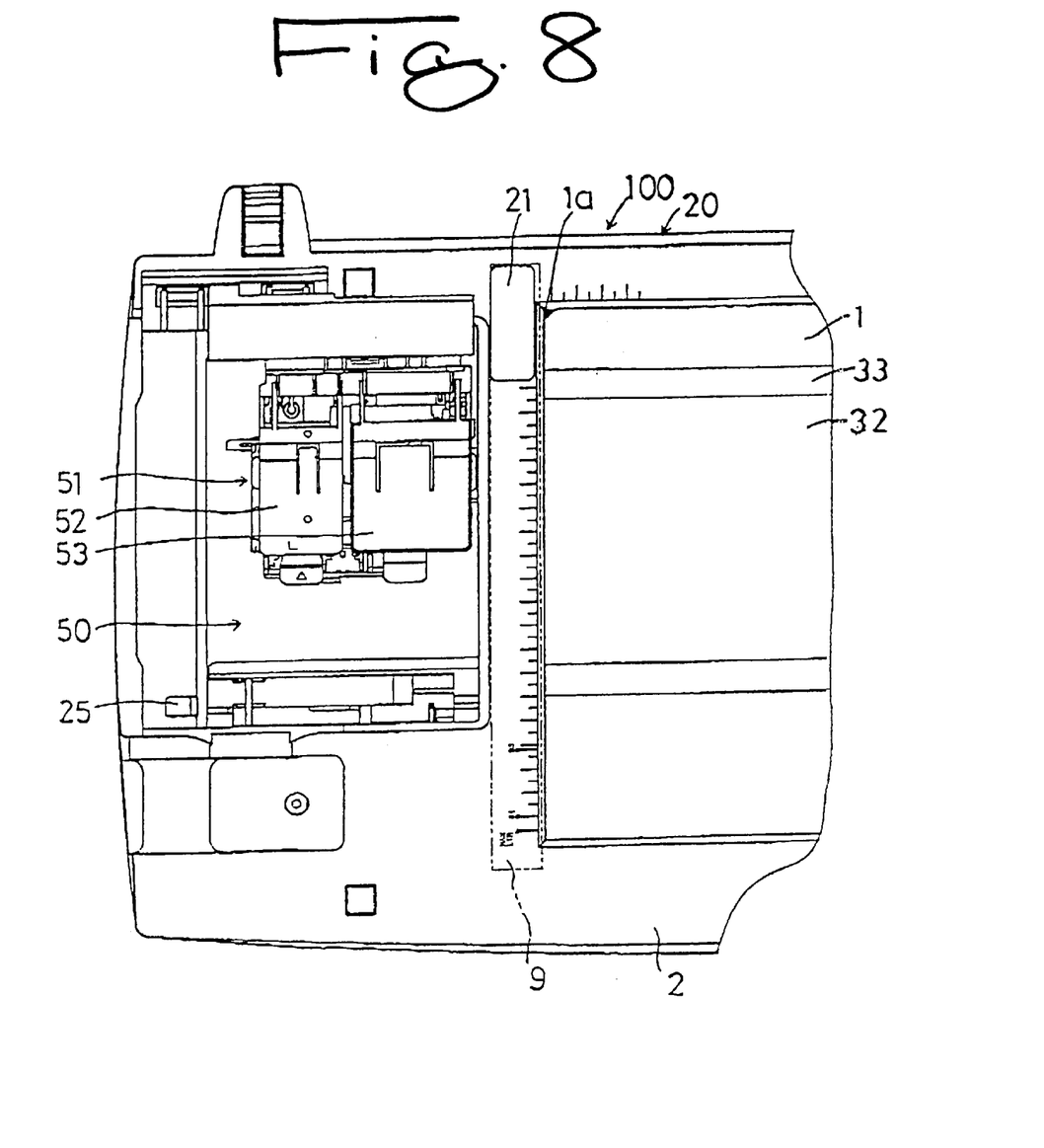
FIG. 8 is a specific plan view of the cartridge exchange door in the closed state of the image input/output apparatus according to the embodiment.

When the user raises the adjustment door 22 in the power-ON state, in accordance with an electric signal transmitted by the light shielding sensor, the control device 14 moves the carriage 3 to the standby position indicated by broken lines in FIG. 5. Thus, the cartridge exchange door 26 is opened, as is indicated by a chain double-dashed line in FIG. 6, by the urging force exerted by the spring 28. At this time, when a cartridge exchange switch (not shown) on the console panel 81 is turned on, the print head 81 is moved to the cartridge exchange position, as is shown in FIG. 8. Therefore, while referring to the cartridge exchange method depicted on the instruction labels 29, the user can change the ink cartridges 52 and 53. It should be noted that to simplify the explanation the adjustment door 22 is not shown in FIGS. 7 and 8.

The reason that the adjustment door 22 is located at the initial position of the carriage 3 in this embodiment will now be explained by using a comparison example in FIG. 9.

Figure 9:
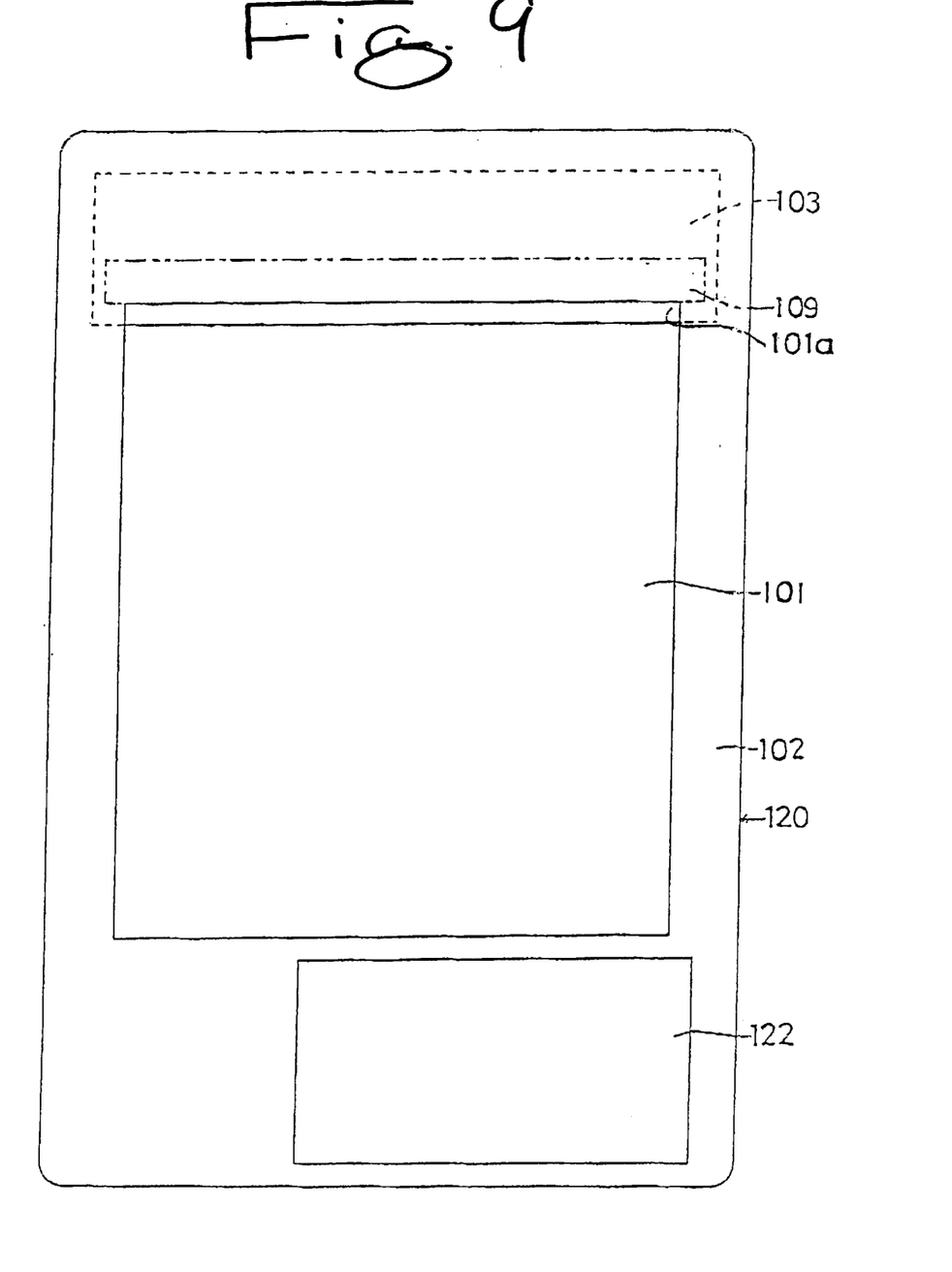
FIG. 9 is a specific diagram showing a comparison example.

As is shown in FIG. 9, for a scanner 120 in the comparison example, a white reference 109 is located at one end portion of an original table 101, while a readout starting point 101a is located adjacent to the white reference 109. Furthermore, one end portion of the carriage 103 is at the initial position, and an adjustment door 122 is provided at the other end portion of the upper face of a housing 102. That is, relative to the original table 101 the adjustment door 122 is located on the opposite side from the white reference 109. Since in this example a printer has the same arrangement as in the embodiment in FIG. 2, no explanation for it will be given.

In the comparison example, since the adjustment door 122 is located on the opposite side of the housing 102 from the white reference 109, with the original table 101 in between, when paper powdery dust or dispersed ink in the printer, which is located below the scanner 120, enters the scanner 120 and adheres to locations adjacent to the white reference 109 or the starting point 101a of the original table 101, it is difficult for a user to raise the adjustment door 122 and insert a hand through the opening to remove the dust, and performing the necessary maintenance is not easy. Furthermore, since besides the space required for the adjustment door 122 at one end portion of the housing 102 additional space is required for the carriage 103 at the initial position, the size of the apparatus is increased and a large installation space is required.

In this embodiment, however, the adjustment door 22 is located on the housing 2 on the side opposite to that of the original table 1, with the white reference 9 and the initial position of the carriage 3 in between. Therefore, when paper powdery dust or dispersed ink enters the scanner 20 from the printer 50 and adheres to locations adjacent to the white reference 9 and the readout starting point 1a of the original table 1, to open the cartridge exchange door 26 the user need only raise the adjustment door 22 for the carriage 3 to be moved to the standby position. Thus, since the user can insert a hand through the opening, and can easily remove the dust, performing this maintenance task is easy. Furthermore, since the carriage 3 is initially located above the cartridge exchange door 26, space for retaining the carriage 3 at the initial position at the end portion of the housing 2 need not be obtained in addition to the space required for the adjustment door 22 and the cartridge exchange door 26. Therefore, the size of the image input/output apparatus 100 can be reduced, and obtaining the necessary installation space is easy.

The detachable partition wall 32 that partitions the scanner 20 and the printer 50 will now be described.

Figure 10:
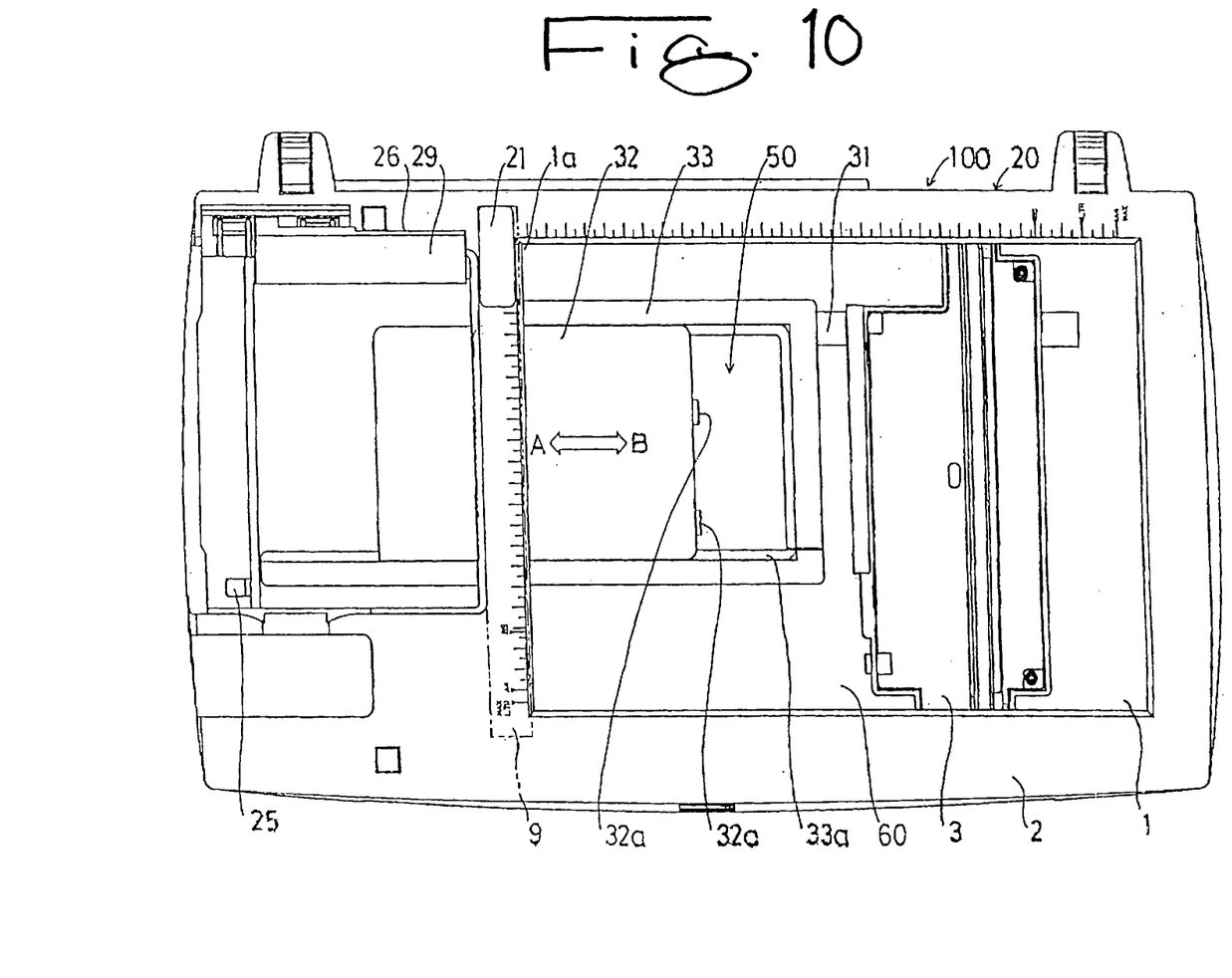
FIG. 10 is a specific plan view for explaining the movement of the detachable partition wall in the closed state of the image input/output apparatus according to the embodiment.

As is shown in FIG. 10, a frame member 33, which is formed for a frame member 60, forms the inner wall of the opening through which the scanner 20 communicates with the printer 50, and has a rail 33a and holes (not shown). The detachable partition wall 32, which is a detachable member, is formed of transparent material and has pawls 32a. The detachable partition wall 32 can slide along the rail 33a in the direction indicated by an arrow A or an arrow B in FIG. 10. The pawls 32a of the detachable partition wall 32 are formed at positions corresponding to the holes in the frame member 33, and are fitted into two holes.

The detachable partition wall 32 is positioned adjacent to the cartridge exchange door 26 when it is closed. Since in the closed state the cartridge exchange door 26 contacts the detachable partition wall 32, the detachable partition wall 32 can not be moved in either direction indicated by the arrows A and B in FIG. 10. When the cartridge exchange door 26 is opened, the detachable partition wall 32 is released from the cartridge exchange door 26, and can slide along the rail 33a.

When the detachable partition wall 32 is moved in the direction indicated by the arrow A in FIG. 10, the scanner 20 communicates with the printer 50. Furthermore, when the detachable partition wall 32 is moved further in the direction indicated by the arrow A, it is removed from the frame member 33. And when detachable partition wall 32 is moved in the direction indicated by the arrow B in FIG. 10 and the pawls 32a are fitted into the holes in the frame member 33, communication between the scanner 20 and the printer 50 is inhibited. Here, an opening/closing device is comprised of the cartridge exchange door 26, the detachable partition wall 32, the frame member 33 and the frame member 60.

Figure 11:
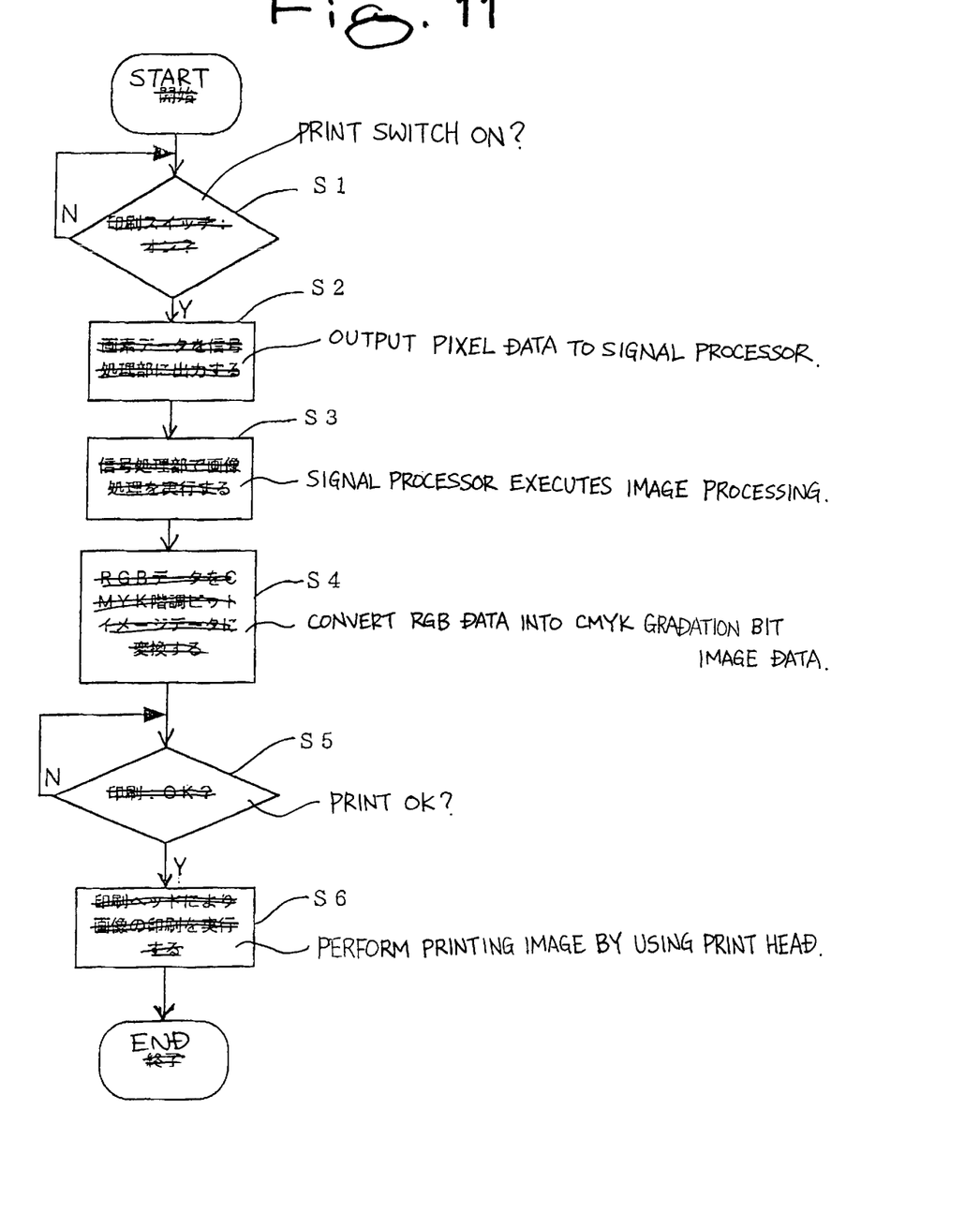
FIG. 11 is a flowchart showing the processing performed by the image input/output apparatus according to the embodiment.

The operation of the thus arranged image input/output apparatus 100 will now be described while referring to FIG. 11.

(1) A user places the original 8 on the original table 1 of the scanner 20, and depresses the print switch 81 of the operating unit 30 to instruct the reading of the original 8. At step S1, upon the receipt of the reading instruction, the control device 14 switches on the light source 4, or the secondary light source, and moves the carriage 4 at a constant speed in the sub-scanning direction. In accordance with a drive signal that is generated at specific predetermined times, an image for one line is read by the photoelectric converting elements of the color pickup device 5. Then, at step S2 the obtained pixel data are transmitted to the signal processor 10.

(2) At step S3, the analog pixel data received by the signal processor 10 are converted into digital pixel data by the A/D converter 12. The shading correction unit 13 performs shading correction for the pixel data, and transmits the resultant data to the gamma correction unit 16. Thereafter, the gamma correction unit 16 performs gamma correction for the received data using a predetermined gamma function.

(3) At step S4, for printing, the correction unit 17 performs a color correction process for RGB data to convert the data into a CMYK tone bit image data. Then, in accordance with a color shade ink table, the obtained CMYK bit image data are sorted into data for various shades. Furthermore, a halftone process, such as dither method and error diffusion, is performed for the obtained data to determine the distribution or the locations of shaded colors on bit maps, so that binary bit maps can be prepared for the individual colors. The bit map data obtained through the half-tone process are temporarily stored in a predetermined area of the RAM belonging to the control device 14.

(4) At step S5, the CPU of the control device 14 transmits a print ready signal to the printer 50, and examines the operating state of the printer 50. When the printer 50 is prepared to print, it transmits to the control device 14 a signal for the CPU requesting the transmission of print data.

(5) At step S6, the CPU of the control device 14 uses a DMA (Direct Memory Access) transfer to sequentially transmit print control data and bit map data for each color to the printer 50. The printer 50 thereafter employs the print head 51 to print an image based on the print data that are sequentially extracted from the RAM belonging to the control device 14.

In the above described embodiment of the present invention, the adjustment door 22 is provided on the housing 2 at the initial position of the carriage 3 on the opposite side of the original table 1. Therefore, when paper powdery dust or dispersed ink adheres to surfaces adjacent to the white reference 9 of the scanner 20 and the readout starting point 1a of the original table 1, the user can insert a hand through the opening provided for the adjustment door 22 and can easily remove the dust. Therefore, maintenance of the image input/output apparatus 100 can be performed easily.

In addition, since the gap between the original table 1 and the adjustment door 22 corresponds to the initial position of the carriage 3, space at the end portion of the housing 2 for accommodating the carriage 3 at the initial position is not required. Therefore, the image input/output apparatus 100 can be compactly made, and installation space can be easily acquired.

In this embodiment, since the light shielding sensor is provided to detect the open/closed state of the adjustment door 22, when the adjustment door 22 is closed, the light shielding sensor outputs an electric signal to the control device 14 to move the carriage 3 from the initial position to the standby position. When the carriage 3 is moved to the standby position, the cartridge exchange door 26 is opened. With this arrangement, when the user opens the adjustment door 22 in the power-ON state, the carriage 3 is moved to the standby position, and the cartridge exchange door 26 is opened. Since the carriage 3 is controlled in accordance with the open/closed state of the adjustment door 22 and the opening and closing of the cartridge exchange door 26 can be precisely controlled, maintenance, such as the replacement of the ink cartridges 52 and 53, can be easily performed.

Furthermore, in this embodiment, since the instruction label 29 on which the cartridge exchange method is illustrated is glued to the face of the cartridge exchange door 26 furthest from the adjustment door 22, for a user, replacement of the ink cartridges is an easy task.

In addition, in this embodiment, since the transparent detachable partition wall 32 is detachably formed for the frame member 33, a printing medium jam in the printer 50 can be easily eliminated by removing the detachable partition wall 32 from the frame member 33. Therefore, maintenance of the image input/output apparatus 100 can be easily performed. And in addition, since the detachable partition member 32 is made of a transparent material, the user can easily ascertain that a printing medium jam has occurred.

In the above embodiment, the present invention is applied for an image input/output apparatus that includes an ink-jet printer; however, the present invention is not limited to this embodiment, and can be applied for an image input/output apparatus that includes a printer having various types of print heads, such as dot-impact print heads.

What is claimed is:

1. An image input/output apparatus, comprising:
   an image reading portion having an original table on which an original is mountable, and a carriage which is movable in parallel to the original table;
   an image printing portion which is capable of printing on a printing medium an image based on an image data which has been read by the image reading portion;
   a signal processing portion which is capable of controlling the image reading portion and the image printing portion;
   a housing which forms a space into which the image reading portion, the image printing portion and the signal processing portion are attachable; and
   a door unit disposed on the housing at an initial position side of the carriage at which the carriage is positioned before reading an image.

2. An image input/output apparatus according to claim 1, wherein the space formed by the housing includes:
   a first accommodation space in which the image reading portion is accommodated, and
   a second accommodation space in which the image printing portion is accommodated.

3. An image input/output apparatus according to claim 2, wherein the door unit includes:
   a first door through which an exterior of the first accommodation space communicates with an interior of the first accommodation space, and
   a second door which is located inside the first door, and through which the first accommodation space communicates with the second accommodation space.

4. An image input/output apparatus according to claim 3, wherein when an electric power is supplied to the signal processing portion and the first door is opened, the second door is opened.

5. An image input/output apparatus according to claim 4, wherein the door unit includes a sensor which detects an opened/closed state of the first door, and wherein the second door is opened when the carriage is moved to the initial position by the signal processing portion in accordance with an electric signal output from the sensor.

6. An image input/output apparatus according to claim 3, wherein a method of adjusting the image printing portion is displayed on a display unit provided on the face of the second door that is opposite to the first door.

7. An image input/output apparatus according to claim 4, wherein a method of adjusting the image printing portion is displayed on a display unit provided on the face of the second door that is opposite to the first door.

8. An image input/output apparatus according to claim 5, wherein a method of adjusting the image printing portion is displayed on a display unit provided on the face of the second door that is opposite to the first door.

9. An image input/output apparatus according to claim 2, further comprising:
   an opening/closing device which partitions the first accommodation space and the second accommodation space, and which permits or denies communication between the first accommodation space and the second accommodation space.

10. An image input/output apparatus according to claim 3, further comprising:
    an opening/closing device which partitions the first accommodation space and the second accommodation space, and which permits or denies communication between the first accommodation space and the second accommodation space.

11. An image input/output apparatus according to claim 4, further comprising:
    an opening/closing device which partitions the first accommodation space and the second accommodation space, and which permits or denies communication between the first accommodation space and the second accommodation space.

12. An image input/output apparatus according to claim 5, further comprising:
    an opening/closing device which partitions the first accommodation space and the second accommodation space, and which permits or denies communication between the first accommodation space and the second accommodation space.

13. An image input/output apparatus according to claim 8, further comprising:
    an opening/closing device which partitions the first accommodation space and the second accommodation space, and which permits or denies communication between the first accommodation space and the second accommodation space.

14. An image input/output apparatus according to claim 13, wherein the opening/closing device includes:
    an opening, through which the first accommodation space communicates with the second accommodation space, and
    a detachable member detachably mounted into the opening.

15. An image input/output apparatus according to claim 14, wherein when the second door is closed, the detachable member is located adjacent to the second door.

16. An image input/output apparatus according to claim 14, wherein the detachable member is slidably disposed in parallel to a direction in which the carriage is moved.

17. An image input/output apparatus according to claim 15, wherein the detachable member is slidably disposed in parallel to a direction in which the carriage is moved.

18. An image input/output apparatus according to claim 14, wherein the detachable member is formed of a transparent material.

19. An image input/output apparatus according to claim 15, wherein the detachable member is formed of a transparent material.

20. An image input/output apparatus according to claim 17, wherein the detachable member is formed of a transparent material.

* * * * *